Patented Sept. 4, 1945

2,384,136

UNITED STATES PATENT OFFICE 2,384,136

PYRIDINE DERIVATIVES AND PROCESS FOR THE MANUFACTURE OF SAME

Otto Schnider, Basel, Switzerland, assignor to Hoffmann-La Roche Inc., Nutley, N. J., a corporation of New Jersey No Drawing. Application September 5, 1941, Serial No. 409,750. In Switzerland September 25, 1940

2 Claims. (Cl. 260—297)

Pyridine derivatives of the general formula

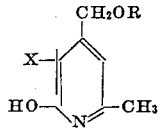

wherein R represents a lower alkyl radical and X is selected from the group consisting of carboxylic acid nitrile, carboxylic acid amide and carboxylic acid lower alkyl ester, are compounds which were found to be useful for the synthesis of vitamin B6 (adermin). A process for the manufacture of compounds of this kind has become known from the Journal of the American Chemical Society, vol. 61, year 1939, page 1242. According to theis paper, 2-methyl-4-ethoxymethyl-5-cyano-6-hydroxypyridine can be obtained by condensing ethoxy-acetyl-acetone with cyanacetic acid amide at moderately elevated temperature in the presence of a condensing agent.

The present invention relates to a new process for the manufacture of the said 2-methyl-4-ethoxymethyl-5-cyano-6-hydroxypyridine derivatives of the above general formula. It has been found that by reacting 2-amino-4-oxo-5-alkoxypentene-(2) with compounds of the general formula

wherein X and Y are radicals selected from the group consisting of carboxylic acid nitrile, carboxylic acid amide and carboxylic acid lower alkyl ester, the said pyridine derivatives may be obtained. The pyridine derivative formed carries in position 5 one of the following substituents: Nitrile, carbalkoxy or carboxylic acid lower alkyl ester.

The compound 2-amino-4-oxo-5-alkoxypentene-(2) used as one of the starting materials may be prepared from alkoxy-acetyl-acetone by the action of ammonia thereon. Preferably, the 5-ethoxypentene-(2) derivative may be used. Other lower alkyl groups may, however, take the place of the ethyl radical. It may, further, in some instances be unnecessary to isolate the 2-amino-4-oxo-5-ethoxypentene-(2) because surprisingly the reaction with certain derivatives of malonic acid or cyanacetic acid occurs equally well in aqueous and non-aqueous solutions.

As the second starting material a compound chosen from the group of certain malonic acid derivatives, viz: malonic acid dinitrile, malonic acid dialkyl esters, e. g., the diethyl ester, and malonic acid diamide, or cyanoacetamide may be used. The substituent obtained at position 5 of the pyridine compound depends on the selection of the second starting material.

The reaction between the pentene derivative and malonic acid dinitrile takes place very easily, even spontaneously. In other cases it may be useful to raise the temperature somewhat above room temperature, to about 50° C., or to heat the reaction mixture to temperatures of about 150–180° C. When malonic acid dialkyl esters are employed, alkali alcoholate, e. g., sodium ethylate, should be added, and the reaction with cyanoacetamide preferably takes place in the presence of a solvent.

The reaction which occurs between the pentene derivative and malonic acid dinitrile is especially surprising since the 6-imino-pyridine derivative would be expected to be formed in analogy to the known reactions between nitriles and amines (see, for instance, Annalen der Chemie, vol. 340, year 1905, page 316). In the present case, however, the reaction between the 2-amino-pentene derivative and malonic acid dinitrile directly yields the desired 2-methyl-4-ethoxymethyl-5-cyano-6-hydroxy-pyridine.

The following examples show in detail methods for the execution of the invention, without, however, limiting its scope thereto.

*Example 1*

66 parts by weight of malonic acid dinitrile are added to a solution of 143 parts by weight of 2-amino-4-oxo-5-ethoxypentene-(2) in 600 parts by weight of water while stirring well. By external heating, the temperature is brought to 45–50° C. The reaction now proceeds with evolution of heat. By appropriate cooling, the temperature is kept between 50 and 60° C. A yellow, temporarily homogeneous solution is obtained. The reaction product soon begins to separate, first as an oil. As the reaction proceeds, more and more crystals precipitate. After 4 hours, the product is cooled, separated and washed with water. The resulting 2-methyl-4-ethoxymethyl-5-cyano-6-hydroxypyridine has the properties described in the literature (Journal of the American Chemical Society, vol. 61, year 1939, page 1243). After dissolving the material and allowing it to crystallise it melts at 210° C.

The same result is obtained if 95% ethyl-alcohol is used as solvent instead of water. Whatever the solvent, the reaction occurs after a while, even without external heating. It becomes manifest by evolution of heat.

Example 2

23 parts by weight of sodium are dissolved in 255 parts by weight of absolute ethyl-alcohol. 143 parts by weight of 2-amino-4-hydroxy-5-ethoxy-pentene-(2) and 160 parts by weight of malonic acid diethyl ester are added to the solution at once and the whole boiled for 4 to 5 hours under reflux. The resulting 2-methyl-4-ethoxymethyl-6-hydroxy-pyridine-5-carboxylic acid ethyl ester remains dissolved as sodium salt. To complete the reaction, the alcohol is distilled off, first at ordinary pressure and finally in vacuo. The sodium salt remains as a yellow, viscous sirup, which is brought into solution by shaking with 150 parts by weight of water. On cooling, the sodium salt of 2-methyl-4-ethoxymethyl-6-hydroxy-pyridine-5-carboxylic acid ethyl ester crystallises in colorless, shining platelets. It is separated. The sodium salt is dissolved by slight heating in 300 parts by weight of water and neutralised with 3-n hydrochloric acid. The 2-methyl-4-ethoxymethyl-6-hydroxy-pyridine-5-carboxylic acid ethyl ester precipitates in colorless crystals. It is freed from the mother liquor and washed with a little ice-cold water. Its melting point is found to be 117–118° C. In cold water it is rather difficulty soluble, easily soluble in hot water. It is easily soluble in the usual organic solvents. With acids and bases it forms water-soluble salts. By saponification, the free acid of melting point 182–183° C. is obtained.

Example 3

A mixture of 143 parts by weight of 2-amino-4-oxo-5-ethoxy-pentene-(2) and 84 parts by weight of cyanoacetamide is heated. At about 120° C. ammonia is slowly evolved and a homogeneous solution is obtained. The temperature is slowly raised to 140–150° C. when the separation of ammonia becomes more and more intensive. After some time 2-methyl-4-ethoxy-methyl-5-cyano-6-hydroxy-pyridine begins to crystallise. When the separation of ammonia has ceased, on keeping the temperature constantly between 140–150° C., which is the case after 1½ to 2 hours, the reaction is complete. On cooling, 2-methyl-4-ethoxymethyl-5-cyano-6-hydroxy-pyridine solidifies completely. It can be purified by dissolving in a dilute solution of caustic soda and precipitation with an acid or by crystallisation from ethyl-alcohol. It melts at 210° C.

The reaction succeeds in the same way if anisole is used as solvent.

Example 4

143 parts by weight of 2-amino-4-oxo-5-ethoxy-pentene-(2) are mixed with 102 parts by weight of malonic acid diamide and the mixture heated in an oil-bath. The malonic acid diamide slowly goes into solution. A strong evolution of ammonia sets in at 180–185° C., which comes to an end after about 3 hours. The liquid reaction product while still warm is poured into 300 parts by weight of water. Thereby, 2-methyl-4-ethoxymethyl-6-hydroxy-pyridine-5-carboxylic acid amide precipitates in the form of crystals. For the purpose of purification it is dissolved in a solution of n-caustic soda and reprecipitated from the solution with 3-n acetic acid.

Another method of purification consists in dissolving the crude 2-methyl-4-ethoxymethyl-6-hydroxy-pyridine-5-carboxylic acid amide in about 4 times the quantity of hot acetic acid and diluting with water until the product becomes turbid, whereupon crystallisation occurs immediately. The crystals separated after cooling melt at 266–267° C.

Example 5

166 parts by weight of the crude sodium salt of ethoxyacetyl-acetone (obtained in accordance with the directions given by Sommelet, Bulletin de la Société Chimique de France [4] 1, page 382) are dissolved in 350 parts by weight of water and the solution treated with 55 parts by weight of ammonium-chloride while stirring. On heating to about 45–50° C., the greater part of the 2-amino-4-oxo-5-ethoxypentene-(2) formed separates as an oil on the surface. After heating for one hour, 66 parts by weight of malonic acid dinitrile are added without isolating the amine, with continuous stirring, whereupon the reaction immediately takes place with evolution of heat. The temperature is kept at about 60° C. for about 2 hours. After cooling, 2-methyl-4-ethoxymethyl-5-cyano-6-hydroxypyridine is isolated as in Example 1.

The same product can be obtained by converting ethoxyacetyl-acetone into the 2-amino-4-oxo-5-ethoxypentene-(2) by short heating with the calculated quantity of aqueous ammonia and then adding malonic acid dinitrile to the aqueous solution.

I claim:

1. In a process for the manufacture of 2-methyl-4-ethoxymethyl-5-cyano-6-hydroxy-pyridine the step comprising reacting 2-amino-4-oxo-5-ethoxy-pentene(2) with malonic acid dinitrile.

2. In a process for the manufacture of 2-methyl-4-ethoxymethyl-5-cyano-6-hydroxy-pyridine the step comprising reacting 2-amino-4-oxo-5-ethoxy-pentene-(2) with malonic acid dinitrile in the presence of a solvent.

OTTO SCHNIDER.